United States Patent [19]

Orlowski

[11] 4,065,241

[45] * Dec. 27, 1977

[54] MOLDING APPARATUS AND METHOD

[75] Inventor: Gerald J. Orlowski, Scottsdale, Ariz.

[73] Assignee: Armour and Company, Phoenix, Ariz.

[*] Notice: The portion of the term of this patent subsequent to Sept. 21, 1993, has been disclaimed.

[21] Appl. No.: 705,160

[22] Filed: July 14, 1976

[51] Int. Cl.$^2$ .............................................. A23P 1/00
[52] U.S. Cl. .................................................. 425/228
[58] Field of Search ........ 425/227, 228, 261, 436 RM; 83/651.1; 15/256.6, 256

[56] References Cited

U.S. PATENT DOCUMENTS 3,982,035   9/1976   Orlowski ...................... 425/261 X

FOREIGN PATENT DOCUMENTS 527,751   6/1931   Germany ........................... 15/256.6

*Primary Examiner*—Francis S. Husar
*Assistant Examiner*—William R. Briggs
*Attorney, Agent, or Firm*—Lockwood, Dewey, Zickert & Alex

[57] ABSTRACT

Improvements in molding apparatus and method for forming a plurality of patties from a mass of agglomerable edible material such as, chopped meat, fish, poultry, vegetables, or the like. The molding apparatus includes a rotatable turret having a plurality of mold cavities positioned therein with a piston reciprocably mounted in each cavity. Upward piston reciprocation forms a mold in the lower portion of the cavity. An improved food-feeding mechanism having an enlarged end opening in communication with the cavity pushes the edible material into the mold over a wide portion of the turret rotation. The piston reciprocates upwardly while in communication with said food-feeding mechanism to draw food material into the mold and avoid air pockets in same. As the turret rotates and the piston reciprocates downwardly to expel the patty, an improved continuous wire band patty cut-off mechanism cleanly separates the patty from the piston to which it typically sticks, without deforming the patty. Any build-up of food material on this cut-off band is wiped off same before that portion of the band is utilized to separate another patty from another piston.

3 Claims, 8 Drawing Figures

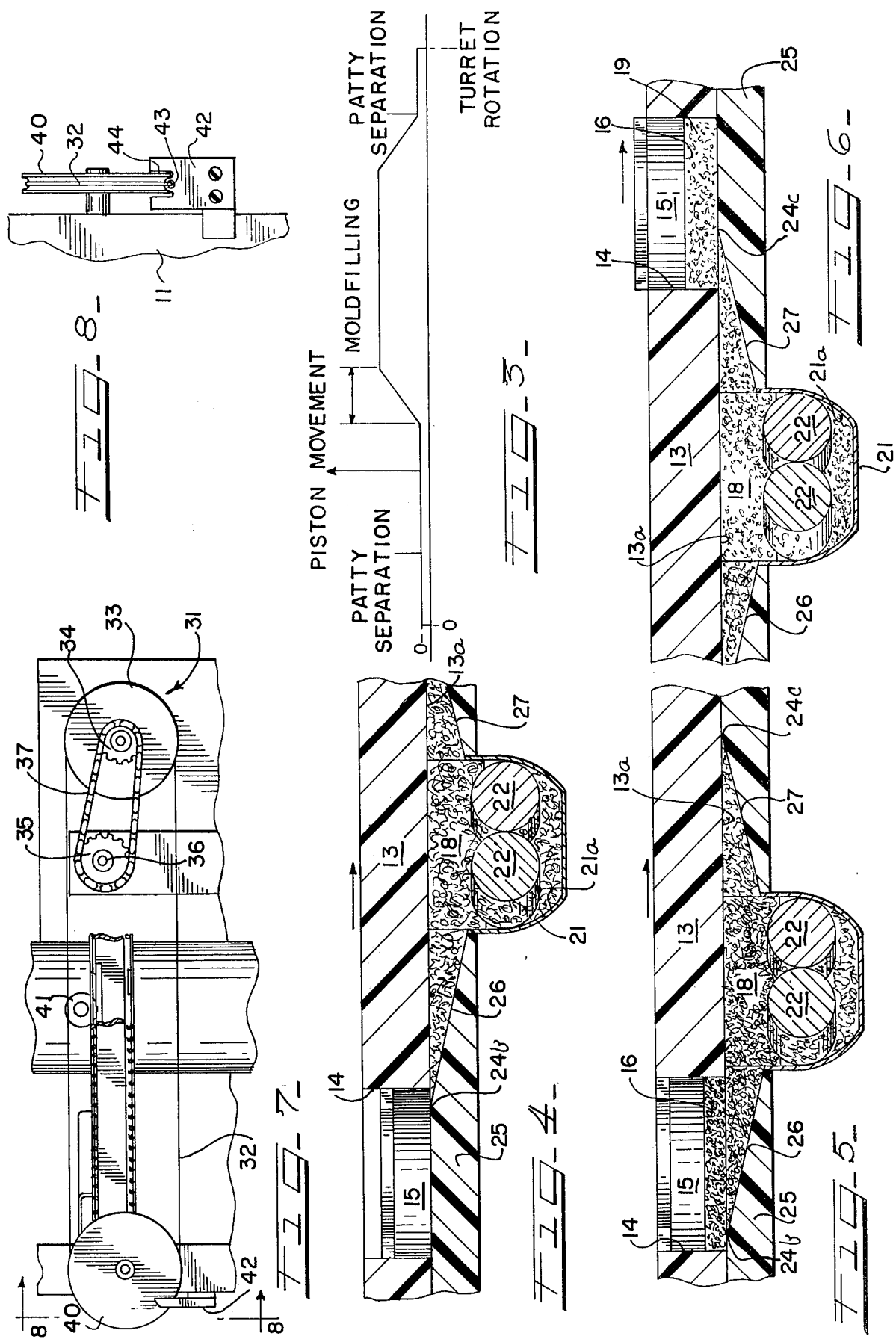

MOLDING APPARATUS AND METHOD

BACKGROUND OF THE INVENTION

This invention relates to improvements in apparatus and method for molding an agglomerable edible material, and more specifically to improvements in molding apparatus and method which are the subject matter of applicant's copending application Ser. No. 507,701, filed Sept. 20, 1974, and entitled MOLDING APPARATUS AND METHOD. In particular, this invention relates to improved means for feeding the edible material from a hopper into individual mold cavities in the apparatus, and to improved means for separating patties formed in each individual mold cavity from a reciprocating barrier means which pushes each patty out of the mold cavity.

The food machinery industry has long made hamburger patties, meatballs, fishcakes, onion rings, and the like on a mass production basis. Applicant's basic apparatus for making patties of edible food material is an improvement upon this prior art and is disclosed in his co-pending application Ser. No. 507,701, and is fully incorporated herein by reference. The basic apparatus includes a turret mounted for power driven rotation around a vertical axis, and it includes a plurality of mold cavities positioned in equal radial and arcuate spacing in the turret, a barrier means or piston is mounted for reciprocation in each mold cavity in the turret. The piston is cam-actuated by a cam positioned around the drive shaft which is on the axis of turret rotation. Applicant's co-pending application teaches urging the food material upwardly through the bottom opening in each mold cavity when the piston is in its uppermost position. The turret is rotated approximately 180°, and the piston reciprocates downwardly and forces the patty out of the mold cavity. A stationary wire cut-off means for separating the patty from the piston bottom surface is positioned across the lowest portion of the path of travel of the piston bottom face. Normally, the patty includes a binder, some grease, or other material so that it sticks to the piston bottom face because of surface tension. Both the patty and the piston bottom surface sweep across the wire cut-off at the juncture of the two. After separation, the patty is gently positioned on a conveyor.

Other edible patty-making machinery utilizing a rotatable turret and a reciprocating barrier means or piston positioned inside each mold cavity include U.S. Pat. Nos. 2,770,202; 3,452,389; and 3,461,483 which all eject a patty upwardly from a mold cavity positioned in the turret. In U.S. Pat. No. 3,633,245, meatballs are ejected downwardly from the mold cavities in which they are formed. However, in that disclosure, the meatballs are scraped from the bottom surface of the barrier means by a rigid knife structure which, by its nature and angled mounting, deforms the food product.

Patents which disclose auger means for feeding edible material into mold cavities include U.S. Pat. Nos. 2,757,411; 2,793,394; 3,887,964; and 3,731,345. All of the above mentioned patents disclose conventional augers which may become clogged by edible material sticking to the auger blade or to the auger housing.

Patents which disclose vents in patty-making machinery for relieving air from the mold cavity include U.S. Pat. Nos. 3,386,129 and 3,731,345. However, the use of air vents for letting air escape the mold cavity as food material is pushed into it, also provides an outlet in which excess food material becomes clogged. Prolonged sticking of agglomerable edible food material on augers or in air vents leads to unsanitary conditions.

SUMMARY OF THE INVENTION

The invention is directed to an improved apparatus for forming a plurality of uniformly shaped patties from a mass of agglomerable edible material, such as hamburger or other chopped meat, fish, vegetables, or the like. The apparatus includes a supporting framework having an electric motor drive means retained thereon. A hopper is attached to the frame and is utilized for receiving a mass of the edible material. The turret is rotatably mounted to the frame and connected to the drive motor. The turret includes a plurality of cavities located in spaced, angular, and radial relation from its vertical axis. Each cavity has a piston or barrier means mounted therein for vertical, reciprocal movement. The bottom surface of each piston coacts with the sidewalls of the cavity to form a mold. A housing means is positioned between the hopper and the turret and edible material is moved therethrough from the hopper and substantially upwardly into the mold, and filling it to form a patty therein as each mold opening is positioned in communication with the housing during a portion of each turret rotation. An auger is positioned in the housing for moving the edible material through it. The improvement is directed to coaction between the auger and housing to move all of the edible material through the housing while leaving no material on either the auger or the housing. The invention is also directed to an enlarged opening in the housing at the end of same which is in communication with the turret. The opening is enlarged substantially along the arcuate path of travel of the mold cavities in the turret to provide for more efficient filling of the mold cavities with edible material.

The apparatus further includes means which coact with the turret for reciprocating the barrier means or piston vertically through the cavity as the turret rotates to push a patty substantially downwardly out of the mold at a portion of turret rotation which is substantially opposite the patty-forming portion. Means including a wire cut-off are connected to the frame for separating a patty from the piston in a manner which prevents patty deformation during separation. The improvement is further directed to timing the coaction of the reciprocal movement of the piston through the cavity to move the piston from the lowest position in its path of travel upward to the highest position in its path of travel during the portion of the turret rotation when the mold opening is in communication with the housing means. This improved means for feeding the product into the mold cavity eliminates the entrapment of air in the cavity during formation of a patty.

The invention is further directed to an improvement in the patty separation means wherein a continuous moving wire band is mounted for cyclical rotation adjacent to the bottom of the turret with a portion of the band positioned to cross the surface of the piston at the lowest portion in its path of travel.

It is therefore an object of the invention to provide an improved apparatus for molding a plurality of individual patties from a mass of agglomerable edible material.

Another object of the invention is the provision of a housing and auger means therein which coact to move all of the edible material through the housing from the hopper into each individual mold cavity while leaving none of the material on either the auger or the housing, and to an improved enlarged opening at the end of the housing which is in communication with the turret.

A further object of the invention is the provision of an improved means for separating a patty from the piston which includes a continuous moving wire band mounted to the apparatus to cleanly separate the juncture between the patty and piston bottom face.

A still further object of the invention is the provision of a method of making patties utilizing the apparatus described wherein the piston is reciprocated upwardly in the mold cavity while the cavity is in communication with the food-feeding mechanism.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in connection with the accompanying drawings, in the several figures of which like reference numerals identify like elements, and in which:

FIG. 3 is a displacement diagram for the cam-operated reciprocating piston;

FIG. 4 is a detail cross-sectional view taken substantially along line 4—4 of FIG. 1;

FIG. 5 is a detail cross-sectional view similar to FIG. 4, wherein the reciprocation upwardly of the piston and the rotation of the turret is further advanced than in FIG. 4;

FIG. 6 is a detail cross-sectional view similar to FIG. 5 wherein the piston is positioned in its highest reciprocal position and the mold has been completely filled with edible material;

FIG. 7 is an elevational view, with portions cut away, of the apparatus of the invention showing the continuous wire band cut-off apparatus for improved patty-piston separation; and FIG. 8 is a front-elevational detail view, with portions cut away, taken substantially along line 7—7, of the wiper for the continuous moving cut-off band.
de

DETAILED DESCRIPTION OF THE INVENTION

Figure 1:
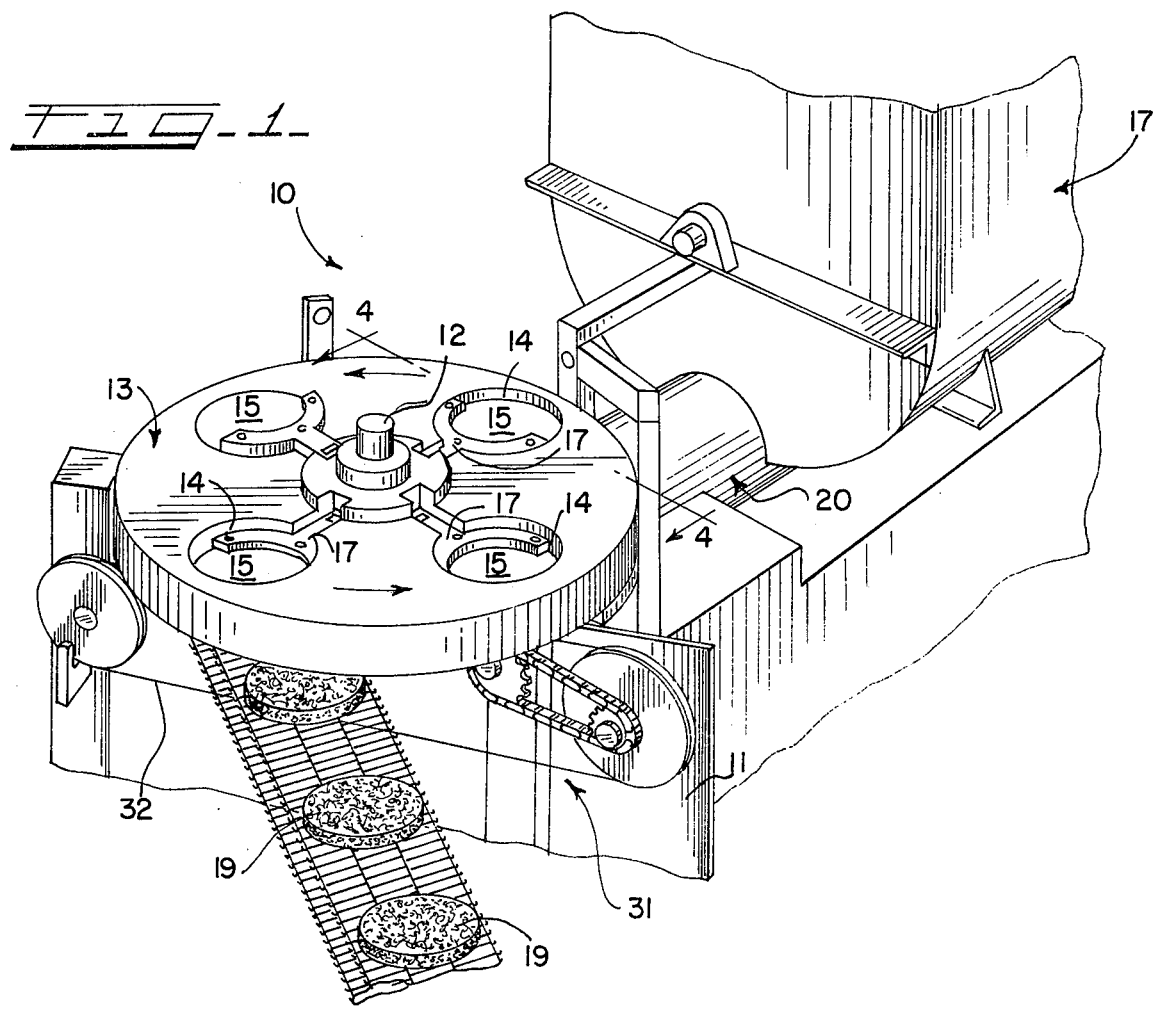
FIG. 1 is a perspective view, with portions cut away, of the improved molding apparatus of the invention.

Referring to FIG. 1, the patty-making apparatus of the invention is shown, generally at 10, with portions of the apparatus not dealing with the improvements of the invention being cut away for purposes of clarity. The improved apparatus of the invention 10 includes a frame 11 upon which is mounted a drive means (not shown) which typically includes an electric motor, drive shaft and gears to power the various portions of the apparatus. One such drive shaft 12 is vertically oriented and powers a rotatable turret, generally indicated at 13, which is mounted to the drive shaft as it extends upwardly from the top of frame 11. Rotatable turret 13 includes a plurality of vertically oriented mold cavities 14 positioned in equally spaced radial and angular relation around the turret axis. The sidewall of each mold cavity 14, in this embodiment, is cylindrical in shape. Each mold cavity 14 has a cylindrical piston or barrier means 15 mounted therein for vertical reciprocal movement. The flat bottom surface 16, (FIGS. 4-6) of each piston 15 together with the portion of each mold cavity sidewall 14 positioned below piston bottom bottom surface 16 and the plane of the bottom surface 13A of turret 13 define the perimeters of each mold. Each piston 15 is attached through connecting bar 17, to a cam-follower and cam mechanism (not shown) mounted radially outwardly of shaft 12 below the turret 13. It should be noted that the drive mechanism and cam mechanism are more fully described in applicant's co-pending application cited above.

A large food receiving hopper, generally indicated at 17 is also mounted on frame 11 and is positioned in spatial relation to turret 13. The hopper may be generally rectangular, cylindrical, conical, or any other appropriate shape which will store relatively large amounts of finely chopped edible material and allow the same to be collected at the hopper bottom as it is drained of food material 18. Along the bottom of hopper 17 and positioned between the hopper and the turret 13, and in communication with both, is a food-feeding mechanism 20. Food-feeding mechanism 20 transfers edible food material 18 from the bottom of the hopper to the turret and upwardly into each mold cavity 14 as the cavity rotates past the mechanism.

Figure 2:
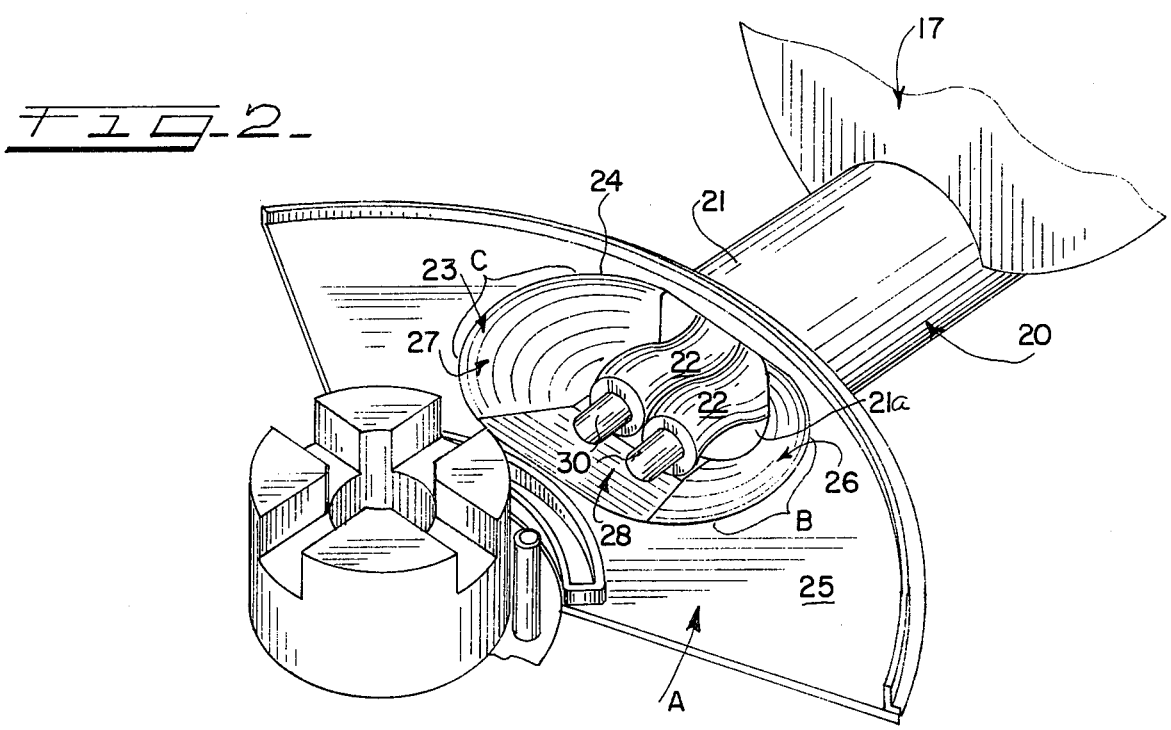
FIG. 2 is an enlarged detail perspective view similar to FIG. 1, but with additional portions cut away and with the turret removed to show the improved food material feed mechanism.

Food-feeding mechanism 20 includes a housing 21 having a hollow interior therethrough. A pair of augers 22 commonly known under the trade name "Moineau" are mounted for coacting rotation in the hollow portion of housing 21 defined by inner wall 21A. "Moineau" augers 22—22, most clearly shown in FIG. 2, are tubular and, as mounted and rotated, mesh in continuous complementary fashion with no open spaces along the line of meshing engagement. The augers are shaped such that pockets are formed between one or both augers and the inner wall 21A of housing 21. The chopped food material in the hopper moves downwardly by gravity into the pockets. As the augers turn, the pockets advance along the inside wall 21A of the housing to the end opening, generally indicated at 23, which is positioned in communication with each mold cavity during a rotation of the turret. As the pockets advance, the portion of the auger behind each pocket sweeps the housing inner wall to assure that all of the food material 18 is moved through the housing and that none of the material sticks to any portion of it. Therefore, no edible food material becomes trapped in the feed mechanism, either in the housing 21 or on the auger 22—22. Since all of the food material 18 moving into the housing 21 is moved therethrough and into the turret mold cavities 14, sanitary conditions in the apparatus are maintained at a high level.

Housing 21 is positioned below the bottom of turret 13. In order that edible food material may be fed upwardly into the mold cavities 14 in the bottom of turret 13, the horizontal end opening 23 in food-feeding mechanism 20 is enlarged to feed food material 18 into mold cavities 14—14 is a most efficient manner. Opening 23, in this embodiment, includes a generally eliptical outer edge 24 which is positioned centrally in a flat horizontal semi-circular retaining plate 25. Plate 25 is rigidly mounted on frame 11 and is positioned such that the bottom surface 13A of turret 13 contiguously sweeps across the top surface of plate 25 during rotation.

As the turret rotates in the direction of arrow A in FIG. 2, the mold cavity 14 first comes in contact with food-feeding mechanism 20 as it crosses the leading edge portion B of edge 24. As soon as the mold cavity sweeps across edge portion 24B, food begins packing into the mold cavity, partly because it is under pressure from the augers 22—22. As the mold cavity advances across opening 23, the piston is reciprocated upwardly in cavity 14 to form the full mold; i.e. the mold is filled as it is formed. As the mold cavity 14 passes trailing edge portion C of edge 24, excess food material 18 extending below the mold is trimmed away by the edge portion to define a flat bottom surface on the patty. Inwardly of the outer edge 24 of opening 23 and adjacent leading edge portion 24C, respectively, are positioned dished or bevelled portions 26 and 27. Leading and trailing dished portions 26 and 27 extend upwardly and outwardly from the inner hollow surface 21A of housing 21. They expand the interface area between housing 21 and turret 13 to increase the angular segment of rotation of the turret during which each mold cavity 14 is in communication with the housing. Inbetween and in communication with dished portions 26 and 27, and inwardly adjacent to the portion of edge 24 which is closest to the drive shaft 12, is a substantially flat wedge portion 28 which extends upwardly and outwardly from the central bottom portion of hollow inner surface 21A of housing 21. In this embodiment, augers 22—22 are rotatably mounted in mountings 30—30 which extend from flat wedge surface 27 toward the tubular hollow inner surface 21A of housing 21.

Referring to FIG. 3, a diagramatic cycle of operation of the apparatus is shown wherein the ordinate shows piston reciprocal movement, and the abscissa shows turret rotation. In applicant's invention, the filling of the mold with food material 18 is accomplished in the portion of turret rotation in which the piston moves from its lowermost position (shown in FIG. 4) upwardly to its highest position (shown in FIG. 6). Separation of each molded patty 19 from the bottom surface of each piston 15 is accomplished when the piston is at its lowest reciprocating position (shown in the foreground of FIG. 1). This displacement diagram in FIG. 3 may be compared with the displacement diagram in FIG. 16 of applicant's co-pending case, Ser. No. 507,701.

In applicant's co-pending case, each mold is filled with food material during the portion of turret rotation when the piston in the mold cavity is at its highest reciprocating position. Therefore, the mold contains air therein before it is filled with food material. Unless the air is vented, it will remain in the mold cavity when food material is inserted therein and, most likely, will form a depression in the top of each patty which is formed in the mold. By maintaining the piston in a downward position until the mold cavity 14 is in communication with opening 23 and the food material in it, and by reciprocating the piston upwardly to create the hollow mold area while the mold cavity 14 is in communication with the with the opening, hollow air spaces in the mold are avoided, and the resultant shape of each patty formed therein is the outline of the mold itself.

It can be seen from the line of piston movement shown in FIG. 3, the portions of the turret rotation in which piston 15 is in reciprocating movement are small compared to the portions of turret rotation in which the piston is either at its uppermost position (FIG. 6) or its lowermost position (FIG. 4). Also, the slope of the lines of piston movement in FIG. 3 are as steep as practicable (approaching 45° or a slope of 1) taking into consideration the cam and cam-follower machinery which acutates the piston reciprocation. By reciprocating piston 15 upwardly with utmost speed, the piston will act in suction to draw food material 18 up into the mold. This suction affects the particle orientation of the food product drawn into the mold. Typically, a ground food product such as hamburger contains a long, thin grain structure. If the piston 15 reciprocates sufficiently fast to draw the ground meat into the mold, the suction will tend to move the grain structure of that ground meat into a vertical orientation. A hamburger patty formed with the grain structure of the hamburger running across the thickness of the pattie is advantageous because, during cooking, hamburger grains tend to shrink to a greater degree across their thickness rather than across their length. Thus, uncooked hamburger patties formed in applicant's apparatus tend to have greater thickness after being cooked than an identical size uncooked patty formed in other patty-making apparatus where the meat grains are not vertically oriented in the mold.

Referring to FIGS. 4, 5, and 6, the operation of filling a mold to form a hamburger or other patty 19 therein utilizing the expanded opening 23 in the food-feeding mechanism 20 is shown. In FIG. 4, the mold cavity 14 in turret 13 has just made contact with the leading edge portion 24B of opening 24, and piston 15 is in its fully downward position. The mold is fully collapsed. As the mold cavity 14 and turret 13 advance to the position shown in FIG. 5, piston 15 has moved upwardly to partially form the mold, food material 18 in the housing 21 has moved into the mold by a combination of being drawn therein as the piston moves upwardly and being pushed therein under pressure from auger 22—22 in the feed mechanism 20. Consequently, the food material completely fills the mold at all times during mold formation when piston 15 reciprocates upwardly in mold cavity 14.

As the mold cavity 14 and turret 13 advance to the position shown in FIG. 6, piston 15 has moved upwardly to its highest position, and the mold has been completely formed and filled with food material 18 to form a patty 19. As the food material in the mold crosses the trailing edge 24C of food-feeding mechanism 20, food outside the mold area is sheared from the material inside the mold area and the flat bottom of the patty 19 is formed. It should be noted that the upper surface of plate 25 should be made of a material having a law co-efficient of friction, such as the fluoro-carbon material ommonly sold under the trademark "Teflon." As the trailing edge of mold cavity 14 passes the trailing edge 24C of the food-feeding mechanism 20, the patty 19 is completely formed in the mold and thereafter is simply being transported to the patty separation portion of the turret rotation.

The improvements in applicant's molding apparatus 10 are also directed to increasing the efficiency with which the fully-formed patty 19 of food material is discharged from the molding apparatus, i.e., the breaking of surface tension between the top of patty 19 and the bottom surface 16 of the piston 15. As in applicant's co-pending application, Serial Number 507,701, a wire is stretched across the path of travel of the bottom surface of the piston when it is at its lowest reciprocating position to separate the patty and the piston. However, in applicant's present invention, rather than using a stationary wire, a rotating continuous band patty separation mechanism, generally indicated at 31, is utilized to perform the same function in an improved manner. Wire band patty separating mechanism 31 is mounted on frame 11 under turret 13 at a position substantially opposite the drive shaft 12 from the position of food-feeding mechanism 20. Wire band mechanism 31, in this embodiment, includes an endless wire band 32 stretched over a driving pulley wheel 33, a large idler pulley wheel 40, and a small idler pulley wheel 41, all rotatably mounted on frame 11. The driving pulley 33 is powered by a sprocket and chain drive including a sprocket 34 axially mounted to pulley wheel 33, a sprocket 35 mounted on drive shaft 36 which extends into frame 11 in driving communication with the drive means therein, and a drive chain 37 connecting sprockets 34 and 35 in driving relation thereto. The large idler pulley wheel 40 is positioned on the opposite side of pulley wheel 33 from the path of travel of bottom surface 16 on piston 15. Endless wire band 32 is mounted around the outside of driving pulley 33 and large idler pulley 40 such that the band crosses the path of travel of bottom surface 16 on piston 15 at its lowest reciprocating position in order to separate a patty from the piston bottom surface to which it sticks typically after it is pushed out of the mold. In order to more accurately guide wire band 32 across the piston bottom surface 16, the band is passed over the small idler pulley wheel 41, which is rotatably mounted to frame 11 at a position closely adjacent the piston path of travel on the same said thereof as pulley wheel 33. Therefore, large idler pulley 40 and small idler pulley 41 actually guide the band in an accurate manner across the piston bottom surface 16 while the driving pulley wheel 33 provides the motive force for moving the band 32 cyclically.

With the utilization of the stationary wire band in the inventor's co-pending application, a build-up of fluid substance on the wire is noted to appear even if the wire had only been utilized to separate one patty from the bottom surface of one piston. This build-up substance is composed of grease, binder, fat, or even bits of the food substance. If the wire with the build-up substance on it is utilized a second time to separate a patty from piston bottom surface, it is noted that the quantity of build-up substance increases and the quality or crispness of the patty separation begins to deteriorate. In order to solve this problem, applicant utilizes the continuous wire band mechanism 31 described above, and drives or moves the wire band 32 with sufficient speed that the portion of the band which has just separated a patty 19 from the piston 15 holding it is completely out of the path of the subsequent piston and patty on the turret as they are drawn across a clean portion of the wire band. Also, a band wiper mechanism 42, shown most clearly in FIG. 8, is attached to frame 11 at a position adjacent large idler pulley 40. Wiper mechanism 42 includes a slit 43 which cleans the band surface as it passes therethrough. In this embodiment, wiper 42 is made of a fluoro-carbon material such as sold under the trademark "Teflon". The wiper includes a cut-out, indent portion 44 which approximates the outer portion of the cross-sectional shape of large idler pulley wheel 40. Slit 43 is positioned in communication with central cut-out portion 44 so as to receive the wire band 32 as it passes over the pulley. The wiper mechanism assures that the build-up substance is removed from the band during each cycle of band rotation.

While a particular embodiment of the invention has been shown and described, it will be obvious to those skilled in the art that changes and modifications may be made without departing from the invention in its broader aspects. Therefore, the aim in the apendant claims is to cover such changes and modifications as fall within the true spirit and scope of the invention.

I claim:

1. In an apparatus for forming a plurality of uniformly shaped patties from a mass of agglomerable edible material; said apparatus including:

a frame;

a drive means retained on said frame;

a hopper attached to said frame for receiving a mass of said edible material;

a turret rotatably mounted to said frame and drivingly connected to said drive means including a plurality of cavities located in spaced angular and radial relation therearound, each cavity having a barrier means mounted for reciprocal movement axially therein, each said barrier means having a bottom surface coating with each said cavity to form a mold;

housing means including auger means therein positioned between said hopper and said turret for moving said edible material through said hopper and substantially upwardly into said mold, filling it, and forming a patty therein as each mold opening is positioned in communication with said material moving means during a portion of each turret rotation;

means coacting with the turret for reciprocating said barrier means through said cavity as said turret rotates to push a patty substantially downwardly out therefrom at a portion of rotation substantially opposite the patty-forming portion; and means connected to the frame for separating a patty from said barrier means in a manner preventing its deformation during separation;

the improvement wherein said patty separation means includes:

opposing spatially related pulley means mounted on said frame, a continuous wire band mounted on and between said pulley means for movement in a loop therearound, and a portion of said band loop being positioned adjacent the bottom of said turret with said band crossing the surface of said barrier means at the lowest portion in the path of travel thereof.

2. The apparatus called for in claim 1 wherein said patty separation means includes:

wiper means mounted to said frame and positioned for communication with said wire band for cleaning same at least once during every cycle of rotation of said band.

3. The apparatus called for in claim 2 wherein the movement of said continuous wire band across the surface of said barrier means is sufficiently fast to allow a clean portion of said band to separate each patty from the barrier means on which it is retained.

* * * * *

UNITED STATES PATENT AND TRADEMARK OFFICE
CERTIFICATE OF CORRECTION

PATENT NO. : 4,065,241
DATED : December 27, 1977
INVENTOR(S) : Gerald J. Orlowski It is certified that error appears in the above-identified patent and that said Letters Patent are hereby corrected as shown below:

Column 3, Line 48, please delete the following: "de",

Column 6, Line 32, please delete the word "auger" and insert in its place the word "augers".

Signed and Sealed this

Second Day of May 1978

[SEAL]

Attest:

RUTH C. MASON
Attesting Officer

LUTRELLE F. PARKER
Acting Commissioner of Patents and Trademarks